United States Patent [19]

Ohbayashi et al.

[11] Patent Number: 4,787,645
[45] Date of Patent: Nov. 29, 1988

[54] SYSTEM FOR STEERING REAR WHEELS OF A MOTOR VEHICLE

[75] Inventors: Shingo Ohbayashi, Ohta; Fusami Oyama, Ohra; Akira Takahashi; Takeo Inoue, both of Ohta, all of Japan

[73] Assignee: Fuji Jukogyo Kabushiki Kaisha, Tokyo, Japan

[21] Appl. No.: 68,544

[22] Filed: Jun. 29, 1987

[30] Foreign Application Priority Data

Jul. 8, 1986 [JP] Japan .................. 61-160130
Jul. 8, 1986 [JP] Japan .................. 61-160131
Jul. 8, 1986 [JP] Japan .................. 61-160132

[51] Int. Cl.$^4$ .......................................... B62D 6/02
[52] U.S. Cl. ...................................... 280/91; 280/691
[58] Field of Search ............... 280/91, 701, 673, 691, 280/690

[56] References Cited

FOREIGN PATENT DOCUMENTS

| | | | |
|---|---|---|---|
| 92907 | 5/1985 | Japan | 280/673 |
| 146707 | 8/1985 | Japan | 280/701 |
| 146708 | 8/1985 | Japan | 280/701 |
| 169310 | 9/1985 | Japan | 280/91 |
| 169311 | 9/1985 | Japan | 280/91 |
| 169312 | 9/1985 | Japan | 280/91 |

Primary Examiner—John J. Love
Assistant Examiner—Karin L. Ferriter
Attorney, Agent, or Firm—Martin A. Farber

[57] ABSTRACT

A steering system has a pair of rectangular frames for suspending rear wheels of a motor vehicle. Each frame is rotatably supported on eccentric portions formed on both sides of a shaft which is longitudinally disposed and rotatably mounted on a body of the vehicle. Accordingly, by rotating the shaft, the frame is deformed by deviation of axes of the eccentric portion to turn the rear wheels.

6 Claims, 5 Drawing Sheets

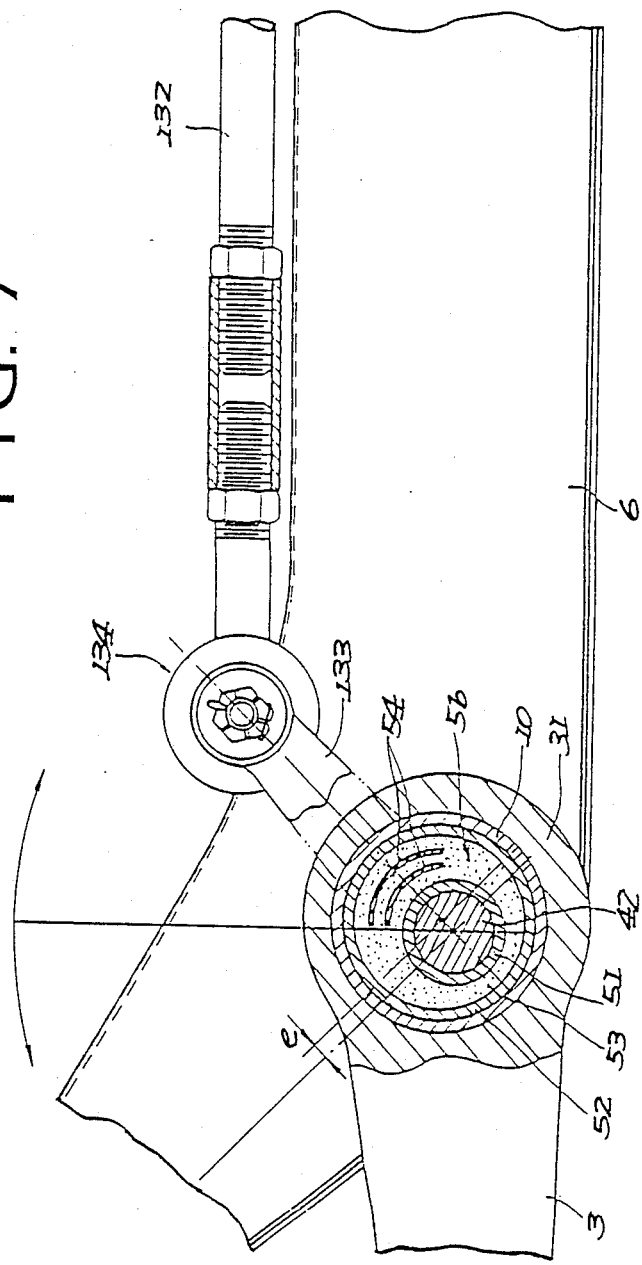

SYSTEM FOR STEERING REAR WHEELS OF A MOTOR VEHICLE

BACKGROUND OF THE INVENTION

The present invention relates to a system for steering rear wheels of a motor vehicle.

A four-wheel steering system for steering rear wheels together with front wheels is known. Japanese Patent Laid Open No. 58-112875 dicloses such a system wherein the rear wheels are steered simultaneously with the front wheels by the operation of a steering wheel. In the system, the steering system of the rear wheels is employed with the steering device operated in the same manner as the front wheels. Namely, the steering device for the rear wheels comprises the same gear device as the front wheel such as a rack and pinion device. The gear device is synchronized with the movement of the front steering system so as to turn the rear wheels about kingpins.

However, the rear steering system is extremely complicated so that not only is the system expensive but it also takes up space. In addition, the proportion of the rear wheel steering angle to the front wheel steering angle is very small. Accordingly, errors in gears and play in links affect the control of the steering angle. In order to accurately control the steering angle, it is necessary to improve the precision of gearings and links and to minimize backlash and play formed therein.

In another system, an actuator operated by an oil pressure device or by an electric motor is provided to directly control the steering system for the rear wheels. However, it is difficult to accurately control a small steering angle and to maintain the rear wheels at desired angular position only by the actuator.

SUMMARY OF THE INVENTION

The object of the present invention is to provide a system for steering rear wheels which can eliminate the above-described disadvantages in the prior art.

According to the present invention, there is provided a system for steering rear wheels of a motor vehicle comprising, a pair of frames for suspending rear wheels, each frame including, a shaft longitudinally disposed and rotatably supported on the body, at least one eccentric supporting means provided on one end portion of the shaft, a pair of laterally disposed links, an inner end portion of one of the links being rotatably mounted on the eccentric supporting means of the shaft and an inner end of the other link being rotatably mounted on the other end portion of the shaft, and an axle provided on outer ends of the links for supporting one of the rear wheels; and means for rotating the shafts in accordance with steering conditions of front wheels of the motor vehicle so as to laterally move the links in a direction and an amount depnding upon the eccentricity of the supporting means to turn the rear wheels.

In an aspect of the invention, the eccentric supporting means is an eccentric supporting portion formed on the shaft, having an eccentric axis with respect to an axis of the shaft.

The other objects and features of this invention will become apparently understood from the following description with reference to the accompanying drawings.

BRIEF DESCRIPTION OF DRAWINGS

FIG. 7 is a partial sectional view of a rear link of FIG. 6.

DETAILED DESCRIPTION OF THE PREFERRED EMBODIMENTS

Figure 1:
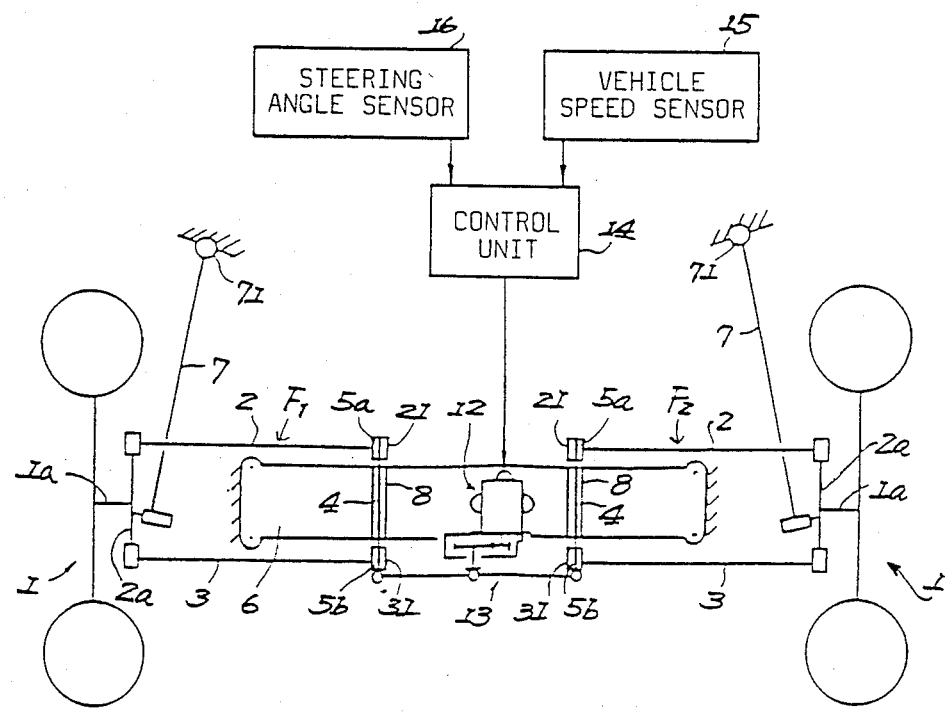
FIG. 1 is a schematic plan view showing a steering system of the present invention.

Referring to FIG. 1 showing a rear wheel suspension and steering system, a pair of rear wheels 1 are rotatably supported on frames F1 and F2 through axles 1a, respectively. Each frame has a rectangular shape and comprises a pair of links 2, 3 laterally disposed with respect to a body of a motor vehicle and longitudinally disposed link 2a and shaft 4.

Figure 3:
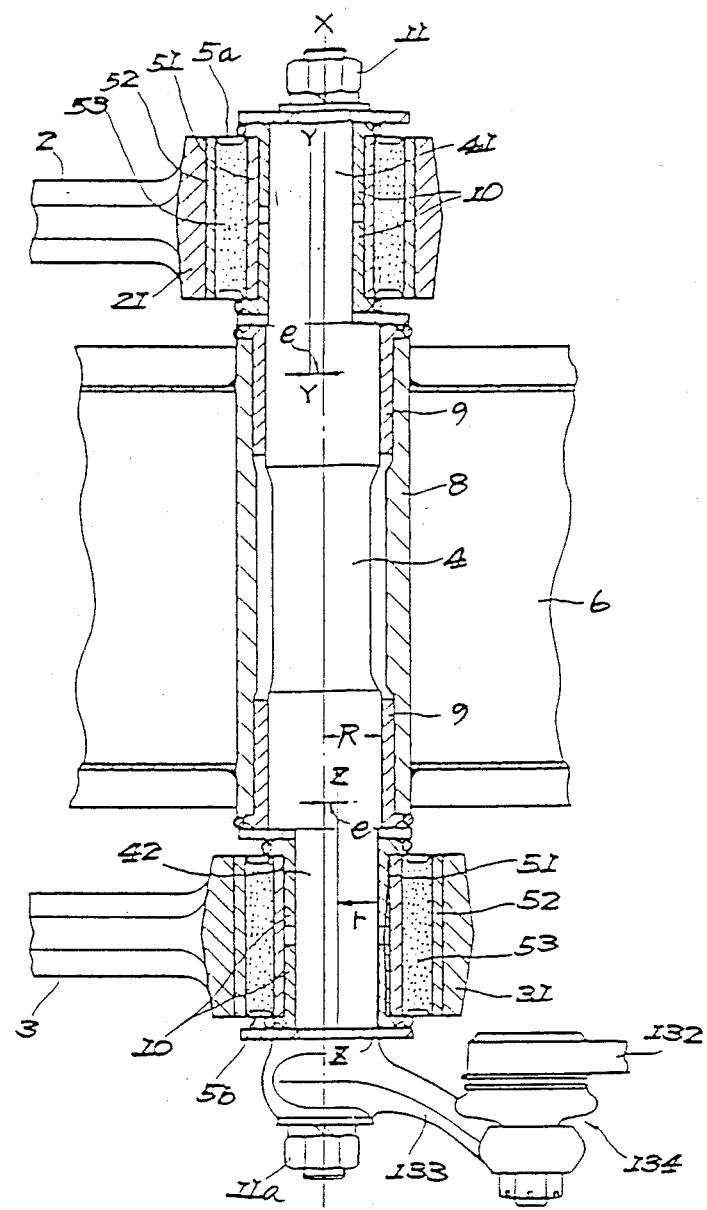
FIG. 3 is an enlarged sectional view of a part of the system of FIG. 1.

Referring to FIG. 3, the shaft 4 is rotatably supported on a cross member 6 of the body through bearings 9 mounted in a sleeve 8 secured to the cross member 6. Front side link 2 and rear side link 3 are rotatably connected to supporting portions 41 and 42 formed at front and rear ends of the shaft 4 through rubber bushes 5a and 5b, respectively.

The front supporting portion 41 is eccentrically formed at a position where the axis Y—Y thereof is deviated with respect to the axis X—X of the shaft 4 by an offset e to form an eccentric shaft portion. The axis Z—Z of the rear supporting portion 42 is also deviated by the offset e from the axis X—X in the opposite direction to the portion 41. Thus, the eccentric supporting portions 41 and 42 are disposed 180° apart, namely diametrically opposed with respect to the axis X—X. Accordingly, when the shaft 4 is rotated, pivots of the links 2 and 3 are displaced, keeping the opposite phase difference.

Figure 4:
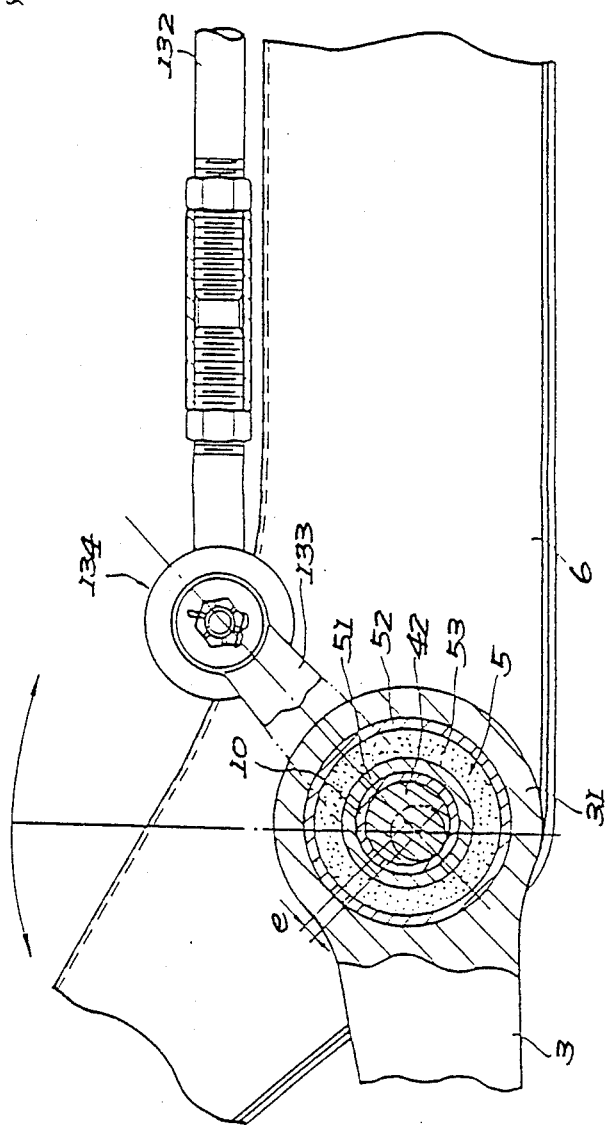
FIG. 4 is a partial sectional view of rear supporting portion of a rear link.

As shown in FIGS. 3 and 4, each of the rubber bushes 5a and 5b comprises an inner sleeve 51, rotatably mounted on collars 10, an outer sleeve 52 coaxial with the inner sleeve 51 and an annular rubber member 53 disposed between both sleeves 51, 52 and secured thereto. The collars 10 for bush 5a are secured to supporting portion 41 by a nut 11. On the other end of the shaft 4, an arm 133 is secured to an extension of the shaft 4 by a nut 11a, thereby securing the collars 10 for bush 5b to the supporting portion 42. The outer sleeves 52 are secured to inside walls of holes of links 2, 3 at ends 21, 31, respectively, so that the links 2, 3 are rotatably supported on supporting portions 41 and 42 through the rubber bushes 5a, 5b.

Figure 2:
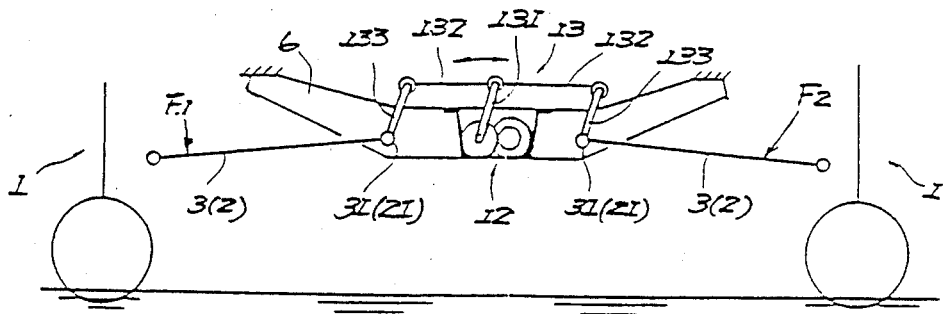
FIG. 2 is a front view of the system.

As shown in FIGS. 1 and 2, arms 133 of both frames F1 and F2 are connected to a connecting rod 132 through joints 134 (FIG. 3), in the form of a parallel link 13. The central portion of connecting rod 132 is connected to an arm 131 which is secured to an output shaft of an actuator 12 comprising a reduction gear device and a motor. The system is provided with a vehicle speed sensor 15, a steering angle sensor 16 for detecting steering angle of the front wheels and a control unit 14 for driving the motor of the actuator 12 so as to control the steering angle and the direction of the rear wheels.

The control unit 14 is provided with a memory storing values of the steering angle for the rear wheels in accordance with the steering angle of the front wheels with vehicle speed as a parameter.

Further, the link 2a of each frame is connected to the body by a radius rod 7 at a forward end 71 to bear the load on the wheel in the longitudinal direction.

When the front wheels are not steered so that the vehicle is driven straight forward, the shaft 4 is held at a predetermined neutral position where the axis Y—Y of the front supporting portion 41 is positioned above the axis X—X and the axis Z—Z of rear supporting portion 42 is below the axis X—X. At the position, there is no relative lateral displacement, namely the displacement in the direction of the width of the vehicle, by the links 2 and 3, so that the rear wheels are in straight-ahead position.

Figure 5:
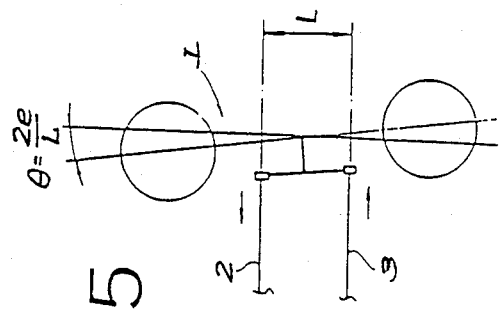
FIG. 5 is an illustration showing a steering operation.

At cornering in a high vehicle speed range, a vehicle speed signal from the vehicle speed sensor 15 and a steering angle signal from the front wheel steering angle sensor 16 are supplied to the control unit 14 which operates to drive the motor of the actuator 12. The motor rotates the shaft 4 through the parallel link 13. If the vehicle turns to the left, each of shafts 4 is rotated by an angle dependent on the steering angle of the front wheels, for example 90 degrees, in the counterclockwise direction in FIG. 2. In the positions, the front supporting portions 41 of both of the right and left wheels rotate in the counterclockwise direction about the axis X—X. The rear supporting portions 42 rotate about the axis X—X also in the counterclockwise direction. As a result, as shown in FIG. 5, the links 2 and 3 are respectively displaced to the left and to the right, each by the amount of the offset e. Thus, the sum of the displacement of the links 2 and 3 is 2e. Accordingly, the rear wheels are turned in the same direction as the steering direction of the front wheels. Therefore, the stability in steering at high vehicle speed is improved.

In the position, steering angle $\theta$ of the rear wheels can be expressed as $\theta = 2e/L$, where L is a distance between the two links 2 and 3. When e=3 mm and L=180 mm, $\theta = 2°$. The amount of the offset e can be arbitrarily controlled between 0 and 3 mm depending on the degree of rotation of the shaft 4. Consequently, the steering angle $\theta$ can be anywhere between 0° and 2°.

At middle vehicle speed, the control unit 14 produces an output signal dependent on the signal from the vehicle speed sensor 15 and the steering angle sensor 16 to rotate the arm 131 in the clockwise direction also by 90 degrees from the neutral position. The link 2 is displaced to the right and the link 3 to the left. Thus, the rear wheels are turned to the right so that the front and the rear wheels are turned in reverse directions, thereby improving steerability.

The driving conditions for each mode may be changed as desired. For example, the rear wheels may be controlled so as to be turned in the same direction as the front wheels at middle and high vehicle speeds and to keep the neutral position at a low vehicle speed.

At any driving condition, whether at cornering or at straight forward driving, the side force exerted on the rear wheels 1 is equally applied to the links 2 and 3. Therefore, torque generated to turn the shaft 4 is cancelled by the supporting portions 41 and 42. Thus, the actuator 12 is not affected by the external force.

In accordance with the present invention, the supporting portions 41 and 42 of th shaft 4 may be arranged so that only one of them is eccentrically deviated. Thus, only one of the links 2 and 3 is displaced when the shaft 4 is rotated. For example, the axis of the shaft 4 and the supporting portion 42 is deviated by the amount of the offset e as shown in the lower part of FIG. 3. Accordingly, the difference between radius R of the shaft 4, which is the radius of the portion supported by the bearing 9, and radius r of the supporting portion 42 is e. When the supporting portion 42 is deviated in the direction perpendicular to the side force P, torque, which can be expressed as P×e, is exerted to rotate the supporting portion 42. The torque is balanced by a counter force $P\mu(R+r)$ where $\mu$ is coefficient of friction of the bearings 9 and collars 10. Thus, $$Pe = P\mu(R+r)$$

Accordingly, $$e = \mu(R+r)$$

When R=25 mm, r=10 mm and $\mu$=0.15, the offset e=5.25. Thus, if the offset is about 5 mm, it is possible to retain a sufficient displacement of the supporting portion by the friction thereof against the side force P, and the rear wheels can be easily steered about 2°. In such a system, an elastic member or play is provided in each of the frames F1 and F2 so as to permit the steering operation.

Figure 6:
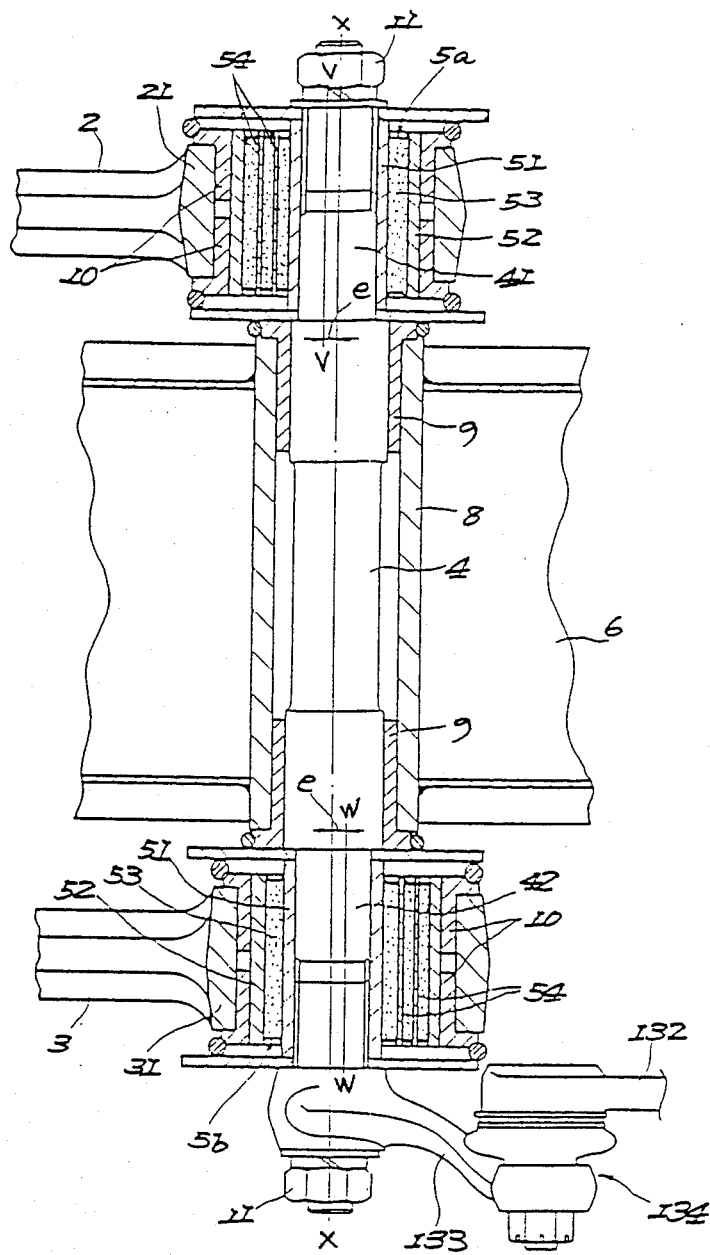
FIG. 6 shows another embodiment of the invention.

Referring to FIGS. 6 and 7 showing another embodiment of the present invention, the supporting portions 41 and 42 are so disposed that each axis thereof is in alignment with axis X—X of the shaft 4. Instead, axis, V—V of the inner sleeve 51 of the front rubber bush 5a which engages the supporting portion 41 is deviated to the left of the axis X—X by the amount e, and axis W—W of the inner sleeve 51 of the rear rubber bush 5b is deviated to the right, also by the amount e.

In such a construction, the thickness of the annular rubber member 53 is inevitably uneven. Consequently, the spring constant of the thick portion is small, which means that the portion is flexible, and the spring constant of the thin portion is large, which means that the portion is stiff. In order to compensate for the difference in spring constants, metal plates 54 are embedded in the thick portion to increase the spring constant thereof. Thus, the rubber member 53 has a substantially fixed spring constant in every radial direction.

Other constructions and operations are the same as the first embodiment and the parts are identified by the same numerals.

Although in the afore-described embodiments, the actuator 12 comprises an electric motor, an actuator employing oil pressure or vacuum may be provided. Additionally, a torque sensor for detecting steering torque for the front wheels may be substituted for the steering angle sensor 16.

From the foregoing, it will be understood that the present invention provides a system for steering rear wheels wherein the construction is compact and simplified so as to greatly reduce the production cost. The steering operation of the rear wheels is improved in that the actuator is capable of accurately controlling the small steering angle of the rear wheels and maintaining the angle by obviating the influence of the side force.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A system for steering rear wheels of a motor vehicle, comprising:
a pair of frames for suspending rear wheels,
each frame including;
a shaft longitudinally disposed and rotatably supported on a body of the motor vehicle,
at least one eccentric supporting means provided on one end portion of the shaft,
a pair of laterally disposed links,
an inner end portion of one of the links being rotatably mounted on the eccentric supporting means of the shaft and an inner end of the other link being rotatably mounted on the other end portion of the shaft, and
an axle provided on outer ends of the links for supporting one of the rear wheels; and
means for rotating the shafts in accordance with steering conditions of front wheels of the motor vehicle so as to laterally move the links in a direction and an amount depending upon the eccentricity of the supporting means to turn the rear wheels.

2. The system according to claim 1, wherein
the eccentric supporting means is an eccentric supporting portion formed on the shaft, having an eccentric axis with respect to an axis of the shaft.

3. The system according to claim 1 wherein the eccentric supporting means is an annular rubber member having an eccentric axis and mounted on the shaft.

4. The system according to claim 1 further comprising a rubber bush disposed between the eccentric supporting means and the link.

5. The system according to claim 4 wherein the rubber bush comprises an inner sleeve secured to the shaft, an outer sleeve rotatably engaged with an end of the link, and an annular rubber member disposed between the inner and outer sleeves and secured thereto.

6. The suspension system according to claim 1 wherein the means comprises a motor for rotating the shaft, a control unit, and sensors for detecting steering conditions.

* * * * *